United States Patent Office 3,401,987
Patented Sept. 17, 1968

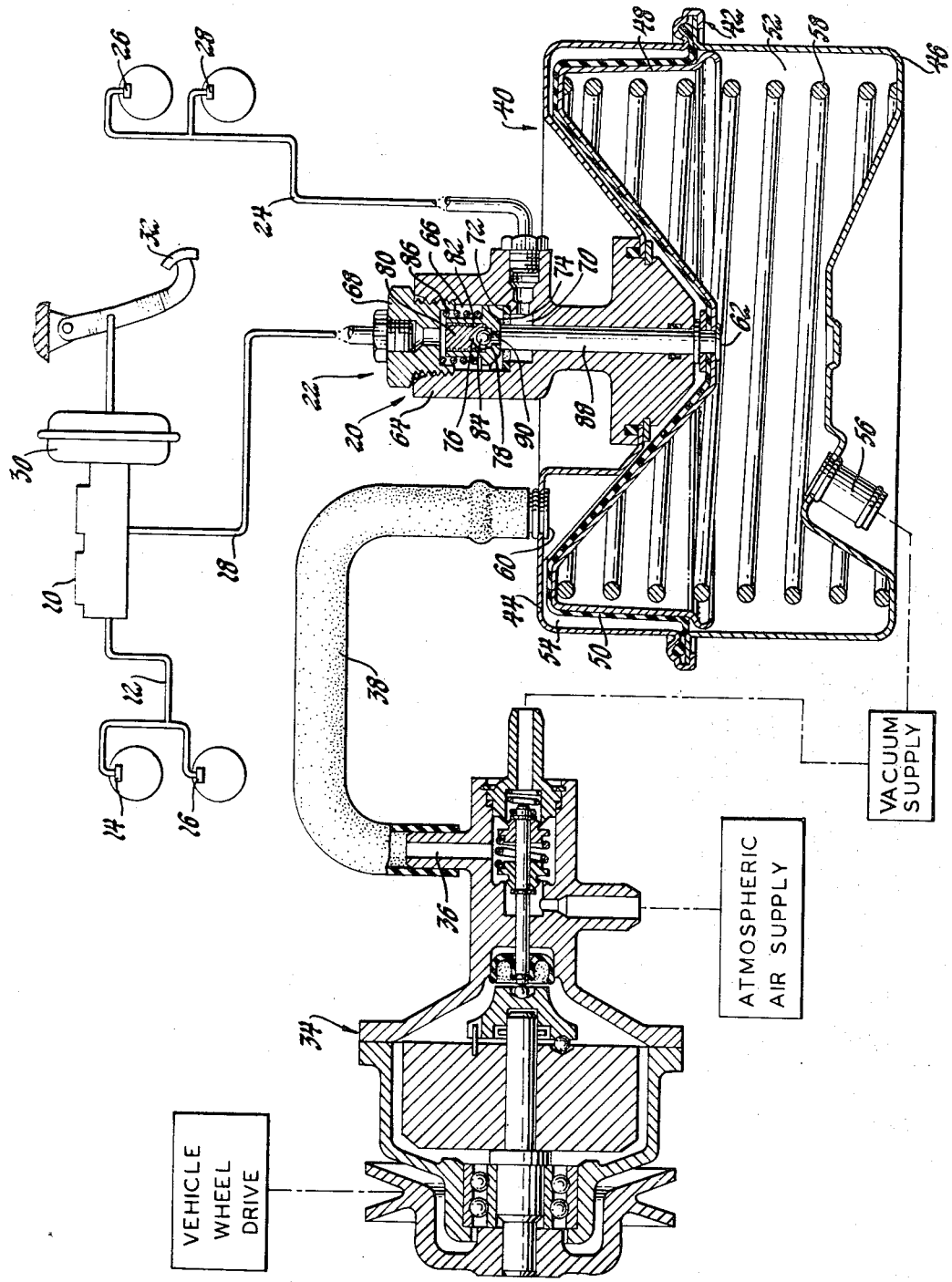

3,401,987
PRESSURE MODULATOR VALVE FOR ANTI-LOCK
BRAKE SYSTEM
Robert A. Horvath, Dayton, Ohio, assignor to General
Motors Corporation, Detroit, Mich., a corporation of
Delaware
Filed Oct. 11, 1967, Ser. No. 674,416
7 Claims. (Cl. 303—21)

ABSTRACT OF THE DISCLOSURE

A brake apply pressure modulator in a vehicle wheel brake anti-lock system which receives signals from an anti-lock sensor and signal generator and acts to limit, decrease, and permit increase of the brake apply pressure in accordance with the anti-lock signals.

---

The invention relates to a brake apply pressure modulator and more particularly to one which is installed fluidly intermediate a master cylinder and a vehicle wheel brake assembly and acts in accordance with signals delivered thereto to limit and release to a lesser value and to permit an increase in the brake apply pressure in a cycle of operation which prevents the wheel brake from locking up and maintains a more effective vehicle braking force. The modulator is illustrated as being embodied in an anti-lock system of the type disclosed and claimed in application Ser. No. 658,420 filed by Donald M. Flory on Aug. 4, 1967, and assigned to the common assignee. The modulator may also be used in the system of application Ser. No. 674,389 filed by this inventor on Oct. 11, 1967, and assigned to the common assignee. It may likewise be utilized in other systems which generate signals for controlling the brake apply pressure. The modulator is illustrated and described as a vacuum suspended unit having a pneumatic section and a hydraulic section. The hydraulic section is connected between the master cylinder and the vehicle wheel brake or brakes being controlled. In the particular system illustrated the modulator controls the brake apply pressure to both rear brakes. However, it is within the scope of the invention that the modulator can be utilized to control the brake apply pressure to any single brake or any combination of brakes desired. It is a feature of the invention that the modulator have a pair of check valves in parallel pressure flow relation, with the primary check valve when unseated permitting considerably greater pressure flow than the secondary check valve. In response to various signals received by the modulator, the check valves are moved from a normally unseated position so that they are sequentially seated. It is preferred that the larger pressure flow primary check valve be seated first and that the smaller pressure flow secondary check valve be seated second. The primary check valve has a spring continually urging it to the seated position so that when it is opened by a pressure differential a relatively large pressure unbalance is required. The secondary check valve has no such valve spring but is arranged in fluid flow series with a restriction plug which effectively damps pressure surges when the valve is opened. The modulator includes a fluid displaceable piston connected to control the sequential seating and unseating action of the check valves and also to increase the effective volume in the vehicle wheel brake while the valves are seated so as to release that pressure to a lower value. The lower value is established by the signals generated in accordance with the anti-lock sensing mechanism. Thus the modulator is particularly adapted to operate with a system utilizing extremal anti-lock control. The piston is so arranged as to be moved outwardly to increase brake apply volume by action of the brake apply pressure on the piston and is limited in such movement by a power wall. The movement and position of the power wall is controlled by the generated signals. Even though the power wall should be moved to a position which would tend to establish a subatmospheric pressure in the vehicle wheel brake, the piston will move only to the extent that the brake apply pressure is reduced to substantially atmospheric pressure, thereby preventing the possible introduction of air in the brake system. This is accomplished by having the piston associated with the power wall only in a freely abutting relationship.

In the drawing:

The single figure includes a schematic illustration of a vehicle wheel brake anti-lock system including a modulator embodying the invention, with parts broken away and in section.

The vehicle wheel brake system includes a master cylinder 10 illustrated as being of the dual pressure chamber type with the front chamber connected through conduit means 12 to the front wheel brakes 14 and 16. The rear chamber of the master cylinder 10 is schematically illustrated as being connected by conduit 18 to the hydraulic section 20 of the modulator assembly 22. The hydraulic section 20 is in turn connected by conduit 24 to the rear vehicle wheel brakes 26 and 28. The master cylinder is illustrated as being operated by a brake booster 30 which is controlled by the vehicle operator through movement of the brake pedal 32.

A wheel anti-lock sensor and signal generator 34 is schematically illustrated as being driven through a vehicle wheel drive arrangement. In the particular system shown in the drawing, the vehicle wheel drive may be the drive shaft of the vehicle connected to the vehicle rear wheels, since the vehicle rear wheels are being controlled by the modulator 22. If, for example, a modulator were to be supplied for each vehicle wheel, the vehicle wheel drive would be connected to the particular wheel being controlled by the modulator. The sensor and signal generator 34 is of the type disclosed and claimed in the above-noted application Ser. No. 658,420, and the disclosure of that application is therefore incorporated herein by reference. The signal generating portion of the assembly 34 is connected to a supply of atmospheric air and a supply of vacuum, as schematically illustrated, and generates pressure signals in the signal generator outlet 36, depending upon the condition of the vehicle wheel or wheels driving the sensor portion of the assembly. As is described in greater detail in the applications referred to above, under normal operating conditions the signal in outlet 36 is vacuum from the vacuum supply. When the vehicle wheel slip ratio increases to an extent portending a vehicle wheel lock condition, sufficient atmospheric air pressure is connected to the outlet 36 to raise the absolute signal pressure to a point intermediate the vacuum pressure and atmospheric air pressure. The extent of this absolute pressure increase is determined by the operating condition of the vehicle wheel or wheels being sensed. During a portion of the operating cycle, when this absolute pressure has increased and acted through the modulator to release the wheel brake apply pressure to a lower value to permit a decrease in wheel slip, the signal pressure is held substantially at an intermediate value and is then, upon other predetermined conditions of the vehicle wheel, returned to the vacuum supply pressure. The pressure signals from the assembly 34 are transmitted to the modulator 22 through the signal conduit 38.

The modulator assembly 22 has a pneumatic section 40 which receives the signals from assembly 34 and includes a housing 42 formed by an upper section 44 and a lower section 46. A piston 48 is positioned within the housing and cooperates with a diaphragm 50 to provide a power wall which divides the housing into a vacuum chamber 52 and a variable pressure chamber 54. Vacuum chamber 52 is connected through suitable conduit means 56 so that chamber 52 is always at the pressure found in the vacuum supply. The vacuum supply may be the vehicle engine intake manifold, and therefore chamber 52 is always at manifold vacuum when the engine is running. Of course, when the engine is not running, chamber 52 will be at atmospheric pressure in the absence of a vacuum accumulating system. A power wall spring 58 is contained in chamber 52 and urges the piston 48 and the diaphragm 50 in a direction tending to decrease the volume of chamber 54. Chamber 54 is connected through inlet 60 with the signal conduit 38 and therefore the pressure in chamber 54 varies in accordance with the signals generated by assembly 34. In the normal condition of brake operation, the pressure signal transmitted to chamber 54 is also the vacuum supply pressure, and therefore the pressure forces are balanced across diaphragm 50. This permits compression spring 58 to hold the power wall in the position shown in the drawing. The power wall has a fastener 62, which may be a rivet, holding the piston 48 and the diaphragm 50 together and having the rivet end extending into chamber 54 acting as a free abutting element for a portion of the hydraulic section 20 described below.

The hydraulic section 20 includes a housing 64 mounted in and forming a portion of the pneumatic housing upper section 44. The housing 64 has an inlet chamber 66 fluid connected with brake pressure conduit 18 through cap 68. It also has an outlet chamber 70 fluid connected to conduit 24. Chambers 66 and 70 are separated by primary valve seat 72 and the primary check valve 74. The primary check valve is mounted in chamber 66 so that in its lower position it is seated against valve seat 72 and prevents fluid from flowing between chambers 66 and 70 around the periphery of the check valve. The check valve 74 is generally annular and contains a secondary check valve chamber 76. The lower end of chamber 76 is formed to provide an annular valve seat 78. The upper portion of chamber 76 is partially closed by a restriction plug 80 so that chamber 76 is fluid connected with inlet chamber 66 by means of a restrictive pressure flow passage 82. An opening is provided through the annular valve seat 78 which fluid connects valve chamber 76 with outlet chamber 70. The secondary check valve 84 is illustrated as being a ball type valve contained in chamber 76 and freely movable therein so that it may be seated on valve 78 or unseated therefrom. A primary check valve spring 86 is positioned in chamber 66 and continually urges the primary check valve 74 toward seating engagement with its seat 72.

A fluid displaceable means in the form of piston 88 is reciprocably mounted in a portion of housing 64 so that it extends into outlet chamber 70 through a wall of that chamber. The upper end of piston 88 is provided with a pin 90 which extends through the secondary valve seat 78 so that the end of the piston forming a shoulder at the base of the pin can engage the lower side of the check valve 74 while the pin 90 extends upwardly a sufficient distance to positively hold the secondary check valve 84 in an unseated position. The other end of piston 88 extends through the housing 64 into the variable pressure chamber 54 and into free abutting relationship with the fastener 62. It can thus be seen that only compressive forces can be transmitted between the pneumatic section power wall and the piston 88.

In the normal condition of brake operation the position of the various elements of the modulator are as shown in the drawing. Thus chambers 52 and 54 are at vacuum supply pressure and spring 58 is holding the power wall in its upward condition so that it positively urges piston 88 upwardly with a sufficient force to hold the primary check valve and the secondary check valve in unseated positions. Therefore the inlet chamber 66 is freely fluid connected to the outlet chamber 70, and the brake apply pressures received by the rear brakes 26 and 28 are those pressures generated by the master cylinder 10 and transmitted through conduit 18.

If the sensor and signal generator assembly 34 senses an incipient vehicle wheel brake locking condition, a pressure signal is transmitted through conduit 38 to chamber 54 as an absolute pressure increase. The unbalance of pressures across diaphragm 50 will become sufficient to overcome the force of spring 58 and, aided by hydraulic pressure acting across the cross section of piston 88 as well as the pre-load and compressive force of valve spring 86, the power wall of the pneumatic section moves downwardly, permitting piston 88 to likewise move downwardly. The primary check valve 74 first seats on valve seat 72, and slight additional downward movement of piston 88 permits the secondary check valve 84 to seat on its seat 78. Thus the master cylinder generated pressure is prevented from further increasing the rear brake apply pressure. Further downward movement of piston 88, as permitted by movement of diaphragm 50 and piston 48, causes the upper end of piston 88 to be disengaged from the valve mechanism and to increase the volume of chamber 70, thereby decreasing the brake apply pressure to the rear brakes. The amount of brake apply pressure released is determined by the signal generated by assembly 34, which positions the pneumatic power wall. If this signal should be such that the piston 88 is moved downwardly to a point where brake apply pressure is substantially zero, the piston 88 will cease its movement even though the power wall may move downwardly further. This effectively prevents the introduction of air in the rear brakes 26 and 28 and brake conduit 24 by preventing a subatmospheric brake apply pressure from being generated. In the usual operation of the system, however, the rear brake apply pressure is merely released to a lower pressure which is sufficient to permit the rear wheels to accelerate with consequent decrease in wheel slip. The power wall will then maintain this position of piston 88 in response to the pressure signal from assembly 34 until the vehicle wheel acceleration changes sufficiently to cause the signal to again decrease in absolute pressure by having the signal generator outlet again connected with the vacuum supply. The signal will then again lower the absolute pressure in chamber 54, decreasing the pressure differential across the power wall and thereby permitting spring 58 to move the power wall upwardly. This movement will positively move piston 88 upwardly, decreasing the volume of outlet chamber 70 and therefore increasing the brake apply pressure at the rear brakes 26 and 28. When the piston 88 moves upward sufficiently, the outer end of pin 90 will engage and unseat the secondary check valve 84, fluid connecting the inlet chamber 66 and the outlet chamber 70 through the restrictive passage 82. Thus if the master cylinder generated pressure in conduit 18 imposed on inlet chamber 66 is still substantially greater than the brake apply pressure in outlet chamber 70, a pressure surge to the wheel brake will be effectively prevented. This is desirable since a sudden high rate change in the brake apply pressure will cause a pressure overshoot that must later be controlled by the system. Further upward movement of piston 88 will cause the piston to engage the lower side of primary check valve 74 in abutting relation and then unseat that valve against the force of the valve spring 86. The inlet and outlet chambers are then again connected in relatively free pressure flow relation. The cycle will be repeated as necessary to prevent the rear brakes from locking and to maintain a more satisfactory braking result.

If the master cylinder generated pressure in conduit 18 is substantially decreased or lessened while the piston 88 is in its downward position, to the extent that the master cylinder generated pressure is less than the brake apply pressure in outlet chamber 70, secondary check valve 84 will immediately open and the pressures will be balanced through the restriction passage 82. If the pressure unbalance is sufficient to overcome the force of primary check valve spring 86, the pressure in chamber 70 will move the check valve 74 upwardly to immediately establish a full pressure flow connection from outlet chamber 70 to inlet chamber 66.

The modulator is constructed so as to permit pressurization of the rear brakes at all times when the wheels are not in an incipient lock condition. Thus, if the vacuum supply is not operative, atmospheric air pressure will be on both sides of diaphragm 50, and spring 58 will still hold piston 88 in the position shown in the drawing. Therefore braking action can be obtained, insofar as the modulator action is concerned, without the presence of vacuum in the system.

While the modulator is illustrated as adapted for receiving pneumatic pressure signals, it may be constructed to receive other types of signals to be compatible with the particular sensor and signal generator assembly used. Thus the signals may be hydraulic or electrical in nature without departing from the scope of the invention in its broader aspects, and the power section may be of a similar nature.

What is claimed is:

1. A pressure modulator having a piston movable in accordance with variations in a sensed condition and comprising:

a housing having a pressure inlet chamber and a pressure outlet chamber formed therein, a first check valve and a second check valve in said housing and fluid connected to permit fluid flow in parallel from said inlet chamber to said outlet chamber when unseated, said piston extending through a wall of said outlet chamber and engaging said check valves in one position to hold both valves unseated to permit free fluid pressure communication between said inlet chamber and said outlet chamber, means permitting movement of said piston by pressure in said outlet chamber in a direction permitting said check valves to sequentially seat and to increase the volume of said outlet chamber to decrease outlet chamber pressure in response to variations in the sensed condition, said means holding said piston in a position determined by said sensed condition and forcibly moving said piston to decrease the volume of said outlet chamber to increase the outlet chamber pressure and sequentially open said check valves in the reverse order from their sequential seating upon further variations in the sensed condition, one of said check valves having fluid pressure restriction means associated therewith to prevent sudden high rate changes in the hydraulic pressure variations in said outlet chamber.

2. The pressure modulator of claim 1, the check valve having the restriction means associated therewith being the second check valve to be seated and the first check valve to be unseated by movements of said piston.

3. The modulator of claim 1, said second check valve when unseated permitting the primary fluid flow between said chambers and having yieldable means urging the valve to a seated position to require a large force unbalance to reopen said second valve, said first valve having fluid restriction means in fluid flow series therewith and during the valve opening sequence being opened by said piston before said second valve is opened whereby fluid moving from one chamber to the other chamber is slowed to the change rate of the fluid system in which the modulator is connected.

4. In a vehicle wheel brake anti-lock system:

a wheel brake system including a wheel having a brake actuated by fluid pressure;

a wheel acceleration and deceleration sensor and signal generator sensing changes in vehicle wheel speed portending wheel brake lock condition and generating signals to control brake pressure to prevent wheel lock;

and a brake pressure modulator controlling brake pressure applied to the wheel brake in accordance with said signals;

said modulator having a brake pressure inlet and a brake apply pressure outlet, a primary and a secondary check valve fluidly intermediate said inlet and said outlet in parallel pressure flow relation and when seated preventing pressure flow from said inlet to said outlet, one of said check valves having means yieldably urging that valve toward a seated position, and fluid displaceable means movable in response to said signals to selectively permit sequential seating of said check valves in response to one of said signals and to positively sequentially unseat said check valves in response to another of said signals.

5. In the vehicle wheel brake anti-lock system of claim 4, said modulator further having pressure flow restriction means in series with the other of said check valves, said other check valve being the first valve to be unseated by positive action of said fluid displaceable means, thereby preventing a pressure change surge through said outlet to said wheel brake.

6. In the vehicle wheel brake anti-lock system of claim 4, said fluid displaceable means being positioned in said outlet and after permitting seating of said check valves and prior to positively unseating said check valves, moving to increase the volume of said outlet and thereby decrease the brake apply pressure at the vehicle wheel brake in response to said one signal.

7. In the vehicle wheel brake anti-lock system of claim 6, said modulator further having a power wall moving and positioned in accordance with and in response to said signals and connected to said fluid displaceable means only in freely abutting relationship whereby said fluid displaceable means is moved to increase outlet volume only by pressure in said outlet acting thereon and to the extent permitted by the position of said power wall.

References Cited

UNITED STATES PATENTS

| | | | |
|---|---|---|---|
| 2,376,124 | 5/1945 | Coulbourn | 137—630 |
| 3,260,556 | 7/1966 | Packer | 303—21 |
| 3,269,781 | 8/1966 | Van House | 303—21 X |

MILTON BUCHLER, *Primary Examiner.*

J. J. McLAUGHLIN, *Assistant Examiner.*